3,848,060
BROMOCINNAMALDEHYDE AS AN INSECT REPELLENT

Goro Izawa, 7-9, 6-chome, Zushi, and Tamio Nishimura, 4063-3 Ikuta, Kawasaki, both of Kanagawa-ken, Japan
No Drawing. Filed July 16, 1973, Ser. No. 379,727
Int. Cl. A01n 9/24
U.S. Cl. 424—333       6 Claims

ABSTRACT OF THE DISCLOSURE

A composition having insect repellent characteristics comprising α-bromo cinnamaldehyde as the main component in a carrier material such as silica gel, talc, p-dichlorobenzene, paint and the like.

---

This invention relates to an insect repellent and antifungal composition which acts by a nontoxic vapor evolved from an insect repellent and antifungal agent of high boiling point and low toxicity, providing both insect repellent and antifungal effect over a long period of time. This invention relates to an insect repellent and antifungal composition which is prepared by adding α-bromocinnamaldehyde to a hygroscopic substance like silica gel, or to a volatile substance like p-dichlorobenzene, or to a carrier like paint, the purpose being to supply an insect repellent and antifungal composition that shows durable effect over a long period of time by a minute quantity of vapor evolved from this composition and which is nontoxic to the human body.

The present inventors examined various chemical agents to find one which would have a powerful insect repellent and antifungal power, low toxicity, and whose vapor would show an excellent effect which is maintained over a long period of time. As a result, the bactericidal agent, α-bromocinnamaldehyde, was found to have excellent properties for attaining this objective.

α-Bromocinnamaldehyde is a solid at ordinary temperature, is a compound with high boiling point, and its vapor pressure is ca. 0.001 mm. Hg at 50° C. The amount of vapor evolved from this substance is so minute that it cannot be measured and yet the vapor shows antifungal and insect repellent activity. This vapor is able to decrease the harmful effect on sheep wool by fiber-eating insects like Attagenus japonicus and clothes moth larvae, and shows insect prevention against ticks, comparable to the action of the insecticide, Dieldrin. The present invention was completed based on this discovery.

The oral toxicity of α-bromocinnamaldehyde in mice, $LD_{50}$, is 1,752 mg./kg. and cutaneous toxicity is 2.220 mg./kg. In chronic tests using rats, histological examination by autopsy showed no changes in the internal organs. These evidences indicate that α-bromocinnamaldehyde has a low toxicity and that a very minute quantity of vapor evolved from it may be considered almost nontoxic to the human body.

The inventors also found that α-bromocinnamaldehyde had almost no effect on electrical properties (dielectric breakdown voltage and volume resistivity), that its vapor effectively acted by permeation through paper or polyethylene bags, that it did not corrode metals, and that it had no adverse effect on natural and synthetic fibers or on paper. Based on such findings, the novel insect repellent and antifungal composition according to the inventions is addition of over 0.001% by weight of α-bromocinnaldehyde to a carrier like silica gel, p-dichlorobenzene, or a paint so that a minute quantity of evolved vapor, nontoxic to the human body, shows an excellent and durable effect over a long period of time.

The present composition has the following characteristics:

(1) When a volatile insect repellent like p-dichlorobenzene or naphthalene is used as the carrier, the characteristics of this agent are utilized and the α-bromocinnamaldehyde vapor supplements the defects of these agents. The volatile insect repellent agents given above have a strong insect repellent power with low toxicity but have no fungicidal action and its insect repellent activity disappears in a short time by volatilization. The insect repellent power of α-bromocinnamaldehyde stays for a long period of time, together with its antifungal activity. This composition therefore maintains the insect repellent and antifungal activities for a long period of time even after decrease of the volatile insect repellents. Therefore, this composition may be effectively used as an insect repellent and antifungal agent for clothes, art objects, antiques, and specimens.

(2) When hygroscopic substances like silica gel and kaolin mineral earth are used as carrier, this hygroscopic substance will remove a large quantity of moisture, which is an important source of fungus production, so that a more perfect and long-term anti-fungal effect can be attained. Silica gel has numerous, unseen capillaries. (The capillaries in 1 g. of silica gel are said to occupy an area of ca. 500 m.$^2$ when extended.) α-Bromocinnamaldehyde adsorbed inside these capillaries is retained there. Since α-bromocinnamaldehyde is a high boiling compound, its evaporation is extremely minute and the insect repellent and antifungal effect of this composition is maintained over a long period of time. The composition of this invention on silica gel base is light in weight (sp. gr. 0.6–0.7) and is easy to handle.

This composition is not sublimable, as is naphthalene, so that there is no fear of its vapor crystallizing in a closed vessel and adhering to other objects. It can therefore be sealed in a vessel of precision photochemical instruments like cameras and microscopes without causing any harm to the lens, shutter, and other precision parts, and still an antifungal effect. It is also useful as an antifungal agent for recording films and microfilms requiring permanent storage, and is also suitable as a desiccating antifungal agent for musical instruments such as piano, violin, flute, etc.

(3) When paint is used as a carrier, this composition can be used safely as an antifungal paint for communication and electrical instruments because this composition, differing from antifungal agents based on an organometallic system, does not destroy electrical insulation. It is especially useful as an antifungal insulation paint.

The carrier for this composition is not limited to the foregoing but also includes a liquid such as alcohol, powders like charcoal powder, and also paper, leather, rubber, plastics, or fiber.

The composition of this invention will be explained with practical examples below.

Example 1

When silica gel is used as a carrier, α-bromocinnamaldehyde is disolved in an organic solvent with a suitable surfactant and the solution is diluted with water to contain 100–30,000 μg./ml. Jellied silica gel, obtained by final washing with water during the manufacture of silica gel, is immersed in this solution of α-bromocinnamaldehyde for a suitable period of time, collected, and dried.

Example 2

When talc powder is employed as a carrier, the above-described solution of α-bromocinnamaldehyde is sprayed while stirring thoroughly and the powder is dried. In this case, a solution in an organic solvent may be sprayed.

Example 3

When p-dichlorobenzene is utilized as a carrier, 1–10 parts of finely powdered α-bromocinnamaldehyde is mixed with 1,000 parts of crystalline powder of p-dichlorobenzene, and suitably formed into granules or beads. Since the melting point of α-bromocinnamaldehyde is 71.5–72° C., it may be added to the fused p-dichlorobenzene, mixed thoroughly, and crystallized.

Example 4

In the case in which paint is used as a carrier, α-bromocinnamaldehyde is disolved in a suitable organic solvent and added to the paint in such a ratio that 0.1–2.0% of α-bromocinnamaldehyde will be present, and mixed thoroughly.

Example for reference 1

Test on the effect of α-bromocinnamaldehyde powder mixed with p-dichlorobenzene powder on ticks (*Tyrophagus dimidiatus* Hermann).

Test method

Two grams of a mixture of compositions shown in Table 1 was placed on a veneer board of 10 x 10 cm., a straw mat of 10 cm.² and 5 cm. in thickness was placed on it, and the straw mat was inoculated with 4,000 ticks (2 g., including feed). The whole was closed in a polyethylene bag and stored in a thermostatic room maintained at 25° C. After 24 hr., 1 week, and 1 month, straw was drawn from the upper, middle, and lower layers of the straw mat and the number of ticks present in 2 g. of this straw was counted by the "heat chasing method." This number was compared with the number of live ticks in the untreated control to obtain the mortality rate and the effect of treatment was examined.

TABLE I

[Test result]

| Sample | No. of repetitions | Index of No. of ticks decreased in 2 g. of straw | | | | | |
|---|---|---|---|---|---|---|---|
| | | 24 hr. | | 7 days | | 30 days | |
| | | No. | Percent | No. | Percent | No. | Percent |
| p-Dichlorobenzene alone | 2 | 41.0 | 45.3 | 7.0 | 94.6 | 855.0 | 30.4 |
| p-Dichlorobenzene (95) plus α-Br-cinnamaldehyde (5) | 2 | 9.5 | 87.3 | 5.5 | 95.7 | 774.0 | 37.0 |
| p-Dichlorobenz (90) plus α-Br-cinnamaldehyde (10) | 2 | 2.5 | 96.7 | 24.0 | 81.4 | 350.5 | 71.5 |
| Untreated control | 2 | 75.0 | | 129.0 | | 1,228.0 | |

Example for reference 2

Test on insect repellent effect of α-bromocinnamaldehyde against fiber-eating insects.

Test method

Test insects (larvae of *Attagenus japonicus* and of clothes moth) were placed in a 1-liter conical flask, 10 insects to a flask, ca. 50 mg. of test sheep wool yarn was added, and a small dish containing α-bromocinnamaldehyde crystals was placed therein. The flask was stoppered tightly and maintained at 25° C. for 7 days. The woolen yarn was then taken out and weighed after naked-eye examination. The difference in weight of the woolen yarn before the start and at the end of the experiment was taken as the amount eaten by the insects. The test was repeated five times.

TABLE 2

[Test result]

| Amount of α-Br-cinnamaldehyde (mg./liter) | Amount of woolen yarn eaten (mean of 5 expt.) (mg.) | Macroscopic evaluation of insect damage |
|---|---|---|
| 0 | 46.90 | Extremely bad. |
| 1 | 15.44 | Bad. |
| 10 | 4.34 | Small. |
| 50 | 3.94 | Do. |
| 100 | 1.62 | Very small. |

Example for reference 3

Antifungal test on vapor of this composition with silica gel as carrier.

A solution containing 15% of α-bromocinnamaldehyde was prepared with toluene and a non-ionic surfactant, and this solution was diluted with water to make solution A containing 30,000 μg/ml. and solution B containing 15,000 μg./ml. of α-bromocinnamaldehyde. Jelly-like silica gel (water content, ca. 70%) just before drying was immersed in each of these two solutions, collected, and dried. Antifungal tests on the vapor evolved from this composition thus prepared were made by the following method and the results are given in Tables 3 and 4.

Test method (Antifungal test)

On a potato-agar medium, one loopful of spores of *Aspergillus niger* was streaked in 10 parallel lines. The sample was placed in the lid of the dish, the dish containing the medium was placed on it with the agar surface down, and the medium was incubated at 27° C. Proliferation of the fungus was checked after 7 days.

(Antifungal test)

The agar media showing no sign of fungal growth after a suitable incubation period were replicated on a fresh agar plate, using flannel cloth, and the plate was incubated at 27° C. for 7 days to observe the growth of the fungus.

TABLE 3

[Antifungal test of vapor of this composition]

| Sample | Quantity (mg.) | Fungal growth after 7 days |
|---|---|---|
| A | 200 | Entirely no growth. |
| B | 200 | Do. |
| Control (silica gel alone) | 200 | Growth over entire surface. |

Sample A

Silica gel immersed in a solution containing 30,000 μg./ml. α-bromocinnamaldehyde and dried.

Sample B

Silica gel immersed in a solution containing 15,000 μg./ml. of α-bromocinnamaldehyde and dried.

TABLE 4

[Antifungal test of vapor of this composition]

| Sample | Quantity (mg.) | Fungal growth after 7 days |
|---|---|---|
| A | 200 | No growth. |
| B | 200 | Do. |
| Control | 200 | Growth over entire surface. |

Replicated 24 hr. later. Samples A and B are the same as described in Table 3.

As shown here, the vapor evolved from this composition had good antifungal activity.

Example for reference 4

Antifungal test of the vapor of this composition with talc as carrier.

A 20% solution of α-bromocinnamaldehyde was prepared with xylene and a non-ionic surfactant and 5 ml. of this solution was sprayed on 100 g. of talc powder with thorough stirring. The dried talc powder and graules prepared from it were submitted to antifungal test by the method described above and its result is given in Table 5.

TABLE 5

[Antifungal test of vapor of this composition]

| Sample | Quantity (mg.) | Fungal growth after— | | | |
|---|---|---|---|---|---|
| | | 3 days | 7 days | 14 days | 21 days |
| C | 100 | − | − | − | − |
|   | 200 | − | − | − | − |
|   | 500 | − | − | − | − |
| D | 100 | − | − | − | − |
|   | 200 | − | − | − | − |
|   | 500 | − | − | − | − |
| Control | 500 | + | + | + | + |

NOTE.—
Sample C: Granular.
Sample D: Powder.
−: Complete inhibition.
+: Fungal growth seen.

Thus, 100, 200 and 500 mg. of this composition completely inhibited the growth of fungus during 21 days of observation.

*Example for reference 5*

Penetration test of vapor from this composition.

This composition described in Example 4 was placed in bags made of polyethylene film and of paper, 1 and 3 g., respectively, and the penetration effect of the vapor evolved from this composition was tested by the method described above. Its result is given in Table 6.

TABLE 6

[Pentration of vapor from this composition]

| Sample | | Quantity (g.) | Fungal growth after— | | | |
|---|---|---|---|---|---|---|
| | | | 48 hrs. | 4 days | 7 days | 14 days |
| Granules | Polyethylene bag | 1 | − | − | − | − |
|   |   | 3 | − | − | − | − |
|   | Paper bag | 1 | − | − | − | − |
|   |   | 3 | − | − | − | − |
| Powder | Polyethylene bag | 1 | − | − | − | − |
|   |   | 3 | − | − | − | − |
|   | Paper bag | 1 | − | − | − | − |
|   |   | 3 | − | − | − | − |
| Control |   | 3 | ± | + | + | + |

NOTE.—
+: Growth of fungus.
−: Complete inhibition of growth.

Thus, the vapor of this composition is known to show its antifungal activity by passing through polyethylene or paper.

What is claimed is:

1. A method for repelling insects from an inanimate object which comprises exposing said object to the vapor of an insect repelling amount of α-bromocinnamaldehyde.

2. The method according to Claim 1 wherein a carrier is employed and said carrier is silica gel.

3. The method according to Claim 1 wherein a carrier is employed and said carrier is p-dichlorobenzene.

4. The method according to Claim 1 wherein the insects are fiber-easting insects or ticks.

5. The method according to Claim 4 wherein the fiber-eating insects are *Attagenus japonicus* or clothes moth larvae.

6. The method according to Claim 4 wherein the ticks are *Tyrophagus dimidiatus Hermann*.

References Cited

UNITED STATES PATENTS

| 2,465,854 | 3/1949 | Dorman et al. | 424—333 |
| 3,457,314 | 7/1969 | Siedel et al. | 424—333 |
| 3,515,671 | 6/1970 | Adams et al. | 424—333 |

OTHER REFERENCES

Chem. Abst. *71*, 123957 (r) (1969) α-Halo-β substituted acrolein bactericide.

Chem. Abst. *54*, 22844 (d–e) (1960) Antifungal agent Ishida et al.

Chem. Abst. *71*, 114119 (s) (1969)—Kimrua et al.

Chem. Abst. *64*, 20439 (e) (1966)—Torres et al.

ALBERT T. MEYERS, Primary Examiner

D. W. ROBINSON, Assistant Examiner

U.S. Cl. X.R.

106—15